United States Patent [19]
Greywall

[11] Patent Number: 5,787,914
[45] Date of Patent: Aug. 4, 1998

[54] HUNTING CANOPY

[76] Inventor: Dennis S. Greywall, 9 S. Ryland Rd., Whitehouse Station, N.J. 08889

[21] Appl. No.: 833,695

[22] Filed: Apr. 8, 1997

[51] Int. Cl.⁶ .................................................. A45B 11/00
[52] U.S. Cl. ...................... 135/90; 135/98; 135/127; 135/100; 135/901; 182/187
[58] Field of Search ........................... 135/90, 98, 127, 135/100, 901; 43/1; 182/187

[56] References Cited

U.S. PATENT DOCUMENTS

| | | | |
|---|---|---|---|
| 2,828,755 | 4/1958 | Stockman | 135/100 X |
| 3,605,771 | 9/1971 | Fox et al. | 135/100 X |
| 4,311,159 | 1/1982 | Wunderlicm | 135/100 |
| 4,312,371 | 1/1982 | Koon | 135/98 X |
| 4,505,286 | 3/1985 | Madion | 135/90 |
| 4,646,770 | 3/1987 | Lobato | 135/901 X |
| 4,706,696 | 11/1987 | Gillis | 135/98 X |
| 4,805,655 | 2/1989 | Justice | 135/90 |
| 4,922,942 | 5/1990 | Schaeffer | 135/90 |
| 5,186,276 | 2/1993 | Craig | 182/187 |
| 5,413,192 | 5/1995 | Woller et al. | 182/187 |

*Primary Examiner*—Wynn Wood Coggins
*Attorney, Agent, or Firm*—DeMont & Breyer

[57] ABSTRACT

A portable, collapsible, water proof canopy especially adapted for use in a tree is provided. A flexible, collapsible frame is detachably coupled to the canopy along its perimeter. Means for suspending the canopy from a tree is disposed near the center of the canopy. Sufficient canopy material is provided so that when the canopy is suspended from the tree at said means, the canopy assumes an approximately conical shape. A user perched in a tree underneath the canopy is thereby partially protected from inclement weather.

17 Claims, 3 Drawing Sheets

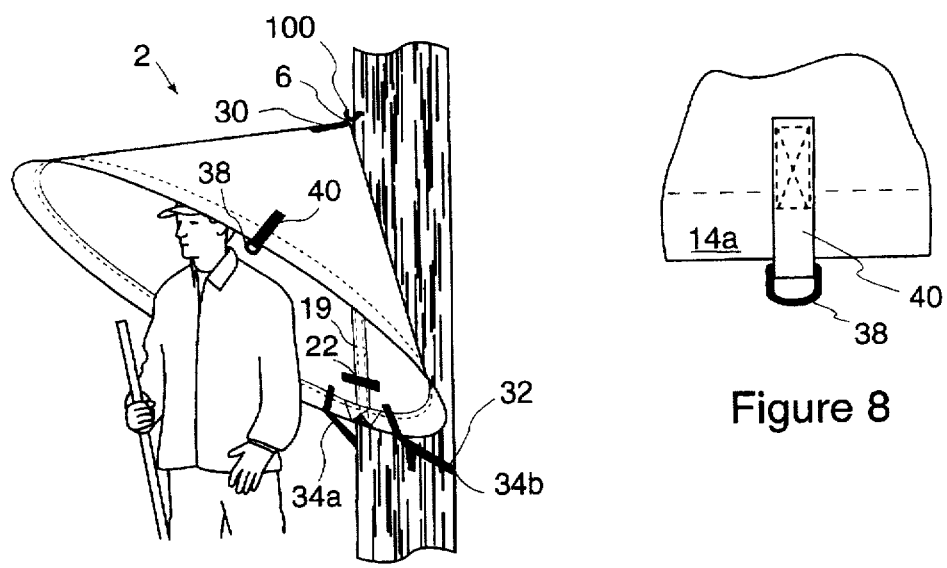
Figure 7
Figure 8
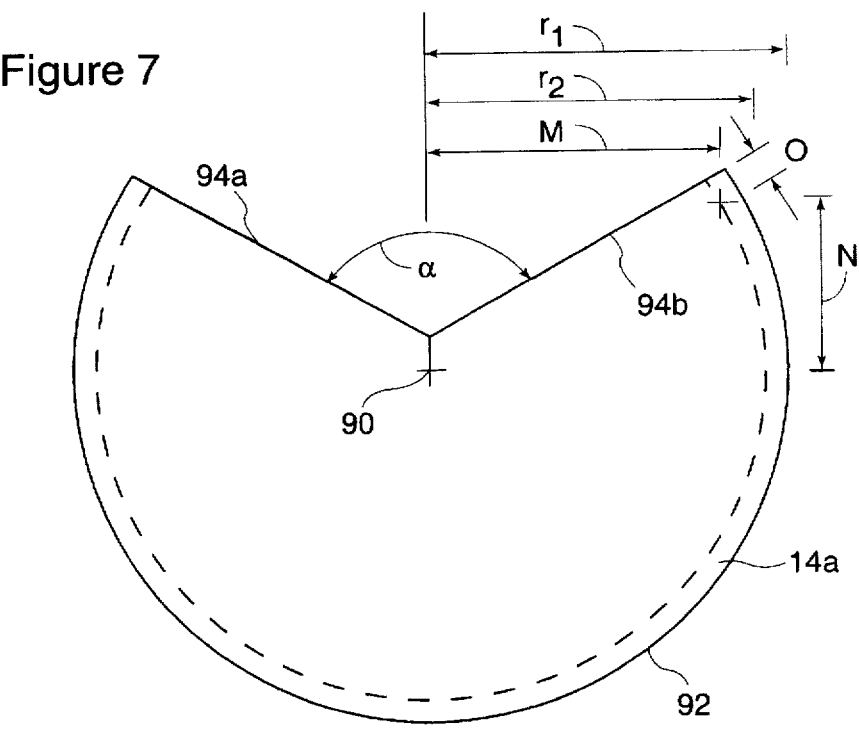
Figure 9

5,787,914

1

HUNTING CANOPY

FIELD OF THE INVENTION

The present invention relates to a portable personnel shelter.

BACKGROUND OF THE INVENTION

Hunters, especially those who hunt with an archery bow, will usually select a site at which to wait for their prey rather than stalking it. Such hunters often climb a tree at the selected site and perch there in preference to waiting at ground level. The additional height provided by their perch provides improved vantage and stealth.

It is not uncommon for hunters to sit at their perch for several hours waiting for their quarry, exposed to weather conditions that are, at times, inhospitable. Waiting in adverse weather conditions, such as rain and the like, is unpleasant, if not unhealthy, and may have the additional undesirable result of rain-soaking the hunter's gear.

Raincoats and the like provide the hunter's body with some protection from inclement weather. Rain garments do not, however, provide a dry environs or provide protection for hunting gear, such as may be afforded by a tent or a lean-to. Unfortunately, tents and the like are ground-based, and offer no help to the hunter at his elevated perch. Moreover, rain garments impede motion and may interfere with shooting, and are noisy. Such interference and noise are anathemas to the hunter.

As such, there is a need for a device that provides, to a hunter perched in a tree, relief from adverse weather conditions while not interfering with the hunt.

SUMMARY OF THE INVENTION

According to the present invention, a portable, collapsible canopy is provided. The canopy may be used advantageously by a sportsman perched in tree elevated above the ground. The canopy is formed of a relatively light weight, water-repellant material. A flexible, collapsible frame is detachably coupled to the canopy along its perimeter. Means by which the canopy can be suspended from a tree is disposed on the weather-exposed side of the canopy near to the center of the canopy. Sufficient canopy material is provided so that when the canopy is suspended at said means, such as by a hook imbedded in the trunk of a tree, the canopy assumes an approximately conical shape tapering from an apex at the suspending means to a base defined by the frame located at the perimeter of the canopy.

BRIEF DESCRIPTION OF THE DRAWINGS

Further features of the invention will become more apparent from the following detailed description of specific embodiments thereof when read in conjunction with the accompanying drawings in which.

2

Figure 1:
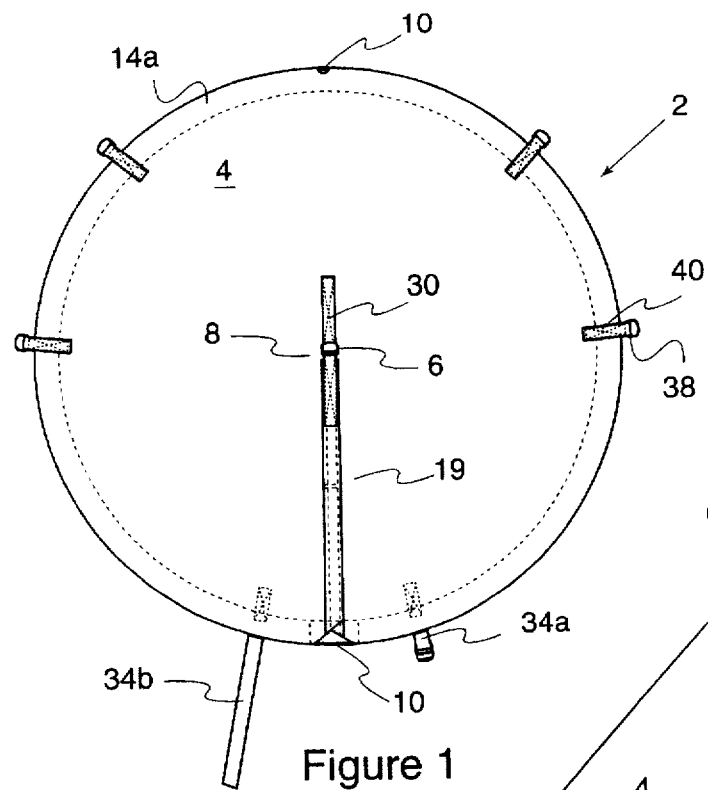
FIG. 1 shows a top view of an exemplary embodiment of a canopy according to the present invention.
Figure 6:
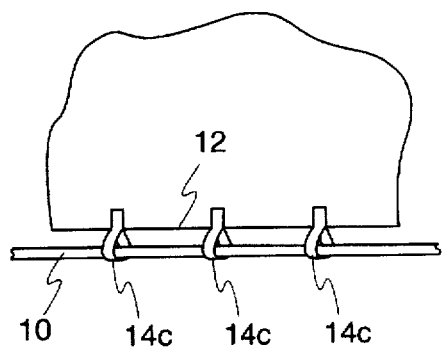

FIG. 6 shows a third embodiment of an arrangement by which the frame is detachably coupled to the canopy body;

FIG. 7 shows a canopy according to the present invention suspended in a tree as in use;

FIG. 8 shows additional detail at the perimeter of the canopy of FIG. 1; and

FIG. 9 shows an exemplary pattern from which the canopy of FIG. 1 can be formed.

DETAILED DESCRIPTION

Figure 2:
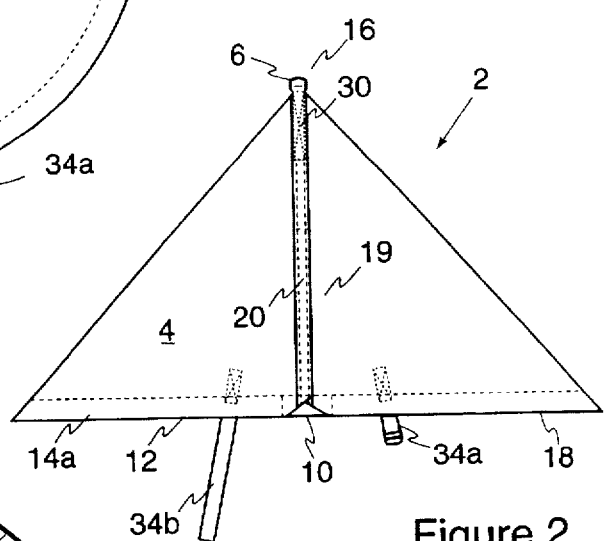
FIG. 2 shows a side view of the exemplary canopy shown in FIG. 1 when the canopy is suspended at the suspending means.
Figure 3:
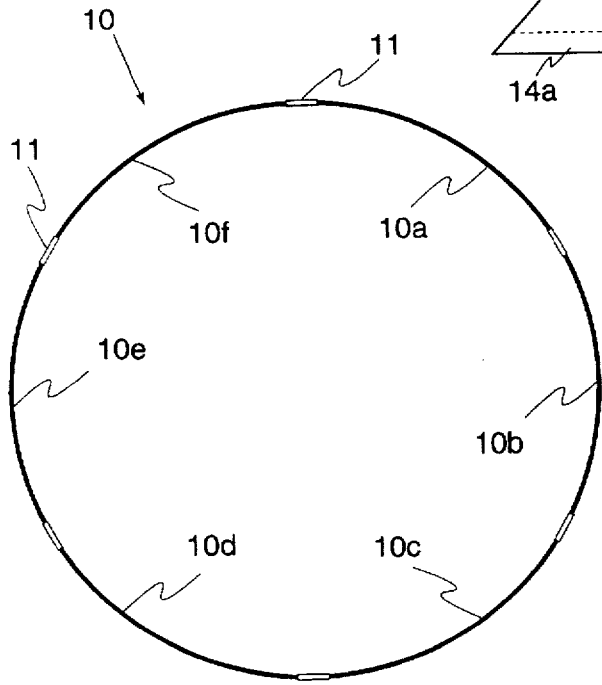
FIG. 3 shows an exemplary embodiment of a frame.

FIGS. 1 and 2 show a top and side view, respectively, of an embodiment of a canopy 2 according to the present invention. Referring to FIG. 1, the canopy 2 includes a body 4 and suspending means 6 that is located near the center 8 of canopy body 4. A frame 10, an embodiment of which is illustrated in FIG. 3 and described later in this specification, is detachably coupled to the canopy body 4 near its perimeter 12. The frame 10 is not visible in FIGS. 1 and 2 because in the embodiment illustrated in those Figures, the frame is enclosed within a pocket or sleeve 14a.

The canopy body 4 is formed of a water-repellent or water-proof and light weight material, such as, without limitation, water-proof nylon. In preferred embodiments, the material's weight is in the range of about 200 to 400 denier, although significantly lighter or heavier material can suitably be used. The canopy body 4 is formed from a sufficient amount of material so that when suspended by suspending means 6, the center 8 of the canopy body 4 is displaced from a plane defined by the perimeter 12 of the canopy body, as shown in FIG. 2. The resulting shape shields a user located beneath the suspended canopy 2 from rain. A camouflage pattern can be reproduced on the canopy body 4.

In presently preferred embodiments wherein the canopy body 4 has a substantially circular shape, the canopy 2 assumes a substantially conical shape when suspended by the suspending means 6. When suspended as described, the suspending means 6 is located at an apex 16, and the perimeter 12 defines a base 18, of the conical shape formed by the canopy 2.

As previously noted, a frame 10 is coupled to the canopy body 4 when the canopy 2 is in use. As will be appreciated from the illustration shown in FIG. 3, the frame 10 establishes and maintains the shape of the base 18 of the canopy 2. The frame 10 is preferably flexible and light weight, and can suitably be formed from materials such as fiberglass, plastic and the like.

It will be appreciated that to maximize the canopy's portability, the frame 10 should be separable from the canopy body 4 and is preferably segmented into several pieces suitably sized to fit, along with the canopy body 4 itself, into a conveniently-sized carrying bag. In preferred embodiments, the frame segments in their unbent form have a length in the range of about 18 to 24 inches. In presently preferred embodiments, such as the embodiment shown in FIG. 3, frame segments 10a-10f are joined with unions 11 and "shock-corded" together. It should be understood that in other embodiments, the frame 10 can include more or less than the six segments 10a-10f shown in FIG. 3.

As noted above, while in transport, the frame 10 is preferably separated from the canopy body 4. Thus, before suspending the canopy 2 in a tree for use, the frame 10 must be coupled to the canopy body 4. In one embodiment of the present invention, the frame 10 is coupled to the canopy body 4 by inserting it into the sleeve 14a located at the perimeter 12 of the canopy body. The sleeve 14a can be formed by folding over or looping the outermost 2 to 4 inches of the canopy body 4 and binding it by riveting, sewing or the like.

When the canopy 2 is in use, the bound sleeve 14a described above advantageously provides the additional benefit of functioning as a drip guard, channeling rain water toward lower points along the side of the canopy thereby preventing rain water from dripping on, or directly in front of, a user located beneath the canopy.

In embodiments using a permanently bound continuous sleeve 14a as described above, the canopy body 4 includes a placket 19 to facilitate inserting the frame 10 into the sleeve 14a. The canopy body 4 is partially radially sectioned or slit at the placket 19. A closure means 20 is provided so that the slit in the canopy body 4 can be closed after the frame 10 is inserted.

Figure 4A:
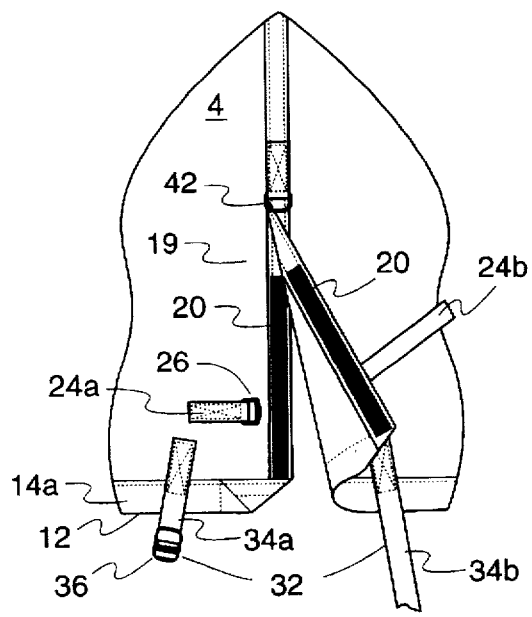
FIG. 4a shows an inside view of the canopy of FIG. 1 illustrating an exemplary placket wherein the placket is open.
Figure 4B:
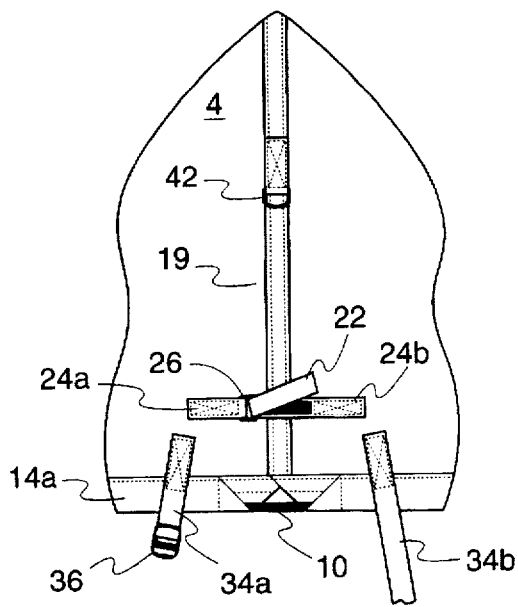
FIG. 4b shows the placket in the canopy body closed.

In the embodiment shown in FIG. 4a, which shows a section of the canopy body 4 that includes the placket 19 as viewed from underneath the canopy 2, the closure means 20 is several patches of velcro™. In alternate embodiments, the closure means can be a zipper, snaps, buttons, cord, hooks, pins, clasps and the like. The placket is shown closed in FIG. 4b.

In preferred embodiments, a secondary closure means 22 is provided underneath the canopy near the perimeter 12 of the canopy body 4. The secondary closure means 22 improves closure of the placket 19 near the perimeter 12. In the embodiment shown in FIGS. 4a & 4b, the secondary closure means is two nylon straps 24a, 24b, one of which is attached to a buckle 26 that receives the other strap. A variety of other implementations of the secondary closure means 22 as will occur to those skilled in the art can suitably be used.

Figure 5:
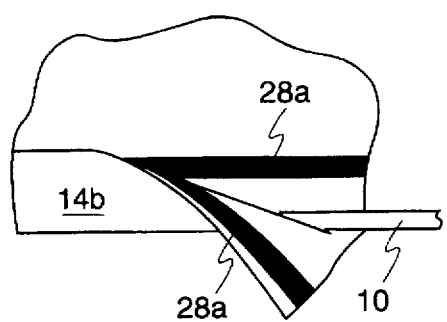
FIG. 5 shows a second embodiment of an arrangement by which the frame is detachably coupled to the canopy body.

It should be appreciated that in other embodiments, the frame 10 may be detachably coupled to the canopy body 4 using other arrangements. For example, as shown in FIG. 5, a sleeve 14b is formed by detachably attaching the folded over portion of the canopy body 4 to the main portion of the canopy body 4 by temporary closure means 28a, which can be, without limitation, snaps, velcro and the like. As such, the sleeve 14b can be opened to receive the frame 10. In another embodiment, a plurality of discrete loops 14c can be formed or attached near the perimeter 12 of the canopy body 4 as shown in FIG. 6. The frame 10 can be threaded through the loops 14c. It will be appreciated that in embodiments such as those depicted in FIGS. 5 and 6, the placket 19 provides no benefit for coupling the frame 10 to the canopy body 4 and is therefore optional.

In use, the canopy 2 is suspended by driving a hook 100 or like member into a tree or other elevated structure, and then placing the suspending means 6 over the hook. A suspended canopy is shown in FIG. 7.

The suspending means 6, and means by which the suspending means is attached to the canopy body 4 should be suitably robust to withstand the force of high winds. The suspending means 6 can be, for example, a "D-"ring formed from metal, heavy duty plastic or the like. In the illustrated embodiment, the suspending means 6 is attached to the canopy body 4 by a strip 30 of material, such as a heavy duty nylon or canvas. The strip 30 can be attached to the canopy body 4 by methods known to those skilled in the art such as sewing, riveting or the like. The suspending means 6 can be attached to the strip 30 by looping an end of the strip 30 about a portion of the suspending means 6 and attaching the looped strip end to another portion of the strip 30, thereby closing the loop.

In an alternative embodiment, the strip 30 itself can be the suspending means. In such an embodiment, a portion of the strip 30 can be folded over on itself and sewn for part of its length so that a loop is formed. Rather than receiving a D-ring or the like, the loop 30 can directly engage the hook 100 that is fixed to the tree.

In a presently preferred embodiment, a primary retaining means 32 stabilizes the canopy 2, such as may be required in windy conditions. In particularly preferred embodiments, the primary retaining means 32 provides another point of attachment to the tree to stabilize the canopy 2. Such an embodiment of the primary retaining means 32 is shown in FIGS. 2, 4a –4b and 7. In that embodiment, the primary retaining means comprises two strips 34a, 34b. The strip 34a has a buckle 36 attached thereto. The canopy 2, while suspended from the suspending means 6, is positioned so the strips 34a, 34b are nearest the tree and therefore at the lowest point of the canopy. The strips 34a, 34b are then placed around the tree and the strip 34b is engaged to the buckle 36. In this manner, a second point of attachment is formed between the canopy 2 and the tree.

In a first alternate embodiment of primary retaining means 32, D-rings or the like, not shown, can be attached to the aforementioned strips. Two additional hooks can be driven into the tree at spaced locations selected to place the strips under tension as each D-ring engages one of the hooks. In a second alternate embodiment, the primary retaining means 32 can be a loop, not shown, disposed along the perimeter 12. A strap, cord or the like can be looped around the trunk of the tree and through the loop.

Optionally, additional secondary retaining means 38 are disposed about the perimeter 12 of the canopy body 4. Four of such secondary retaining means 38 are pictured in FIG. 1. The secondary retaining means 38 can be used in conjunction with a length of cord or the like to provide additional stability to the canopy 2, for example, in very windy conditions. The secondary retaining means 38 can be, for example, a "D-"ring formed from metal, heavy duty plastic or the like. In an embodiment illustrated in FIG. 8, the secondary retaining means 38 is attached to the canopy body 4 near the perimeter 12 by a strip 40. The strip 40 may be formed from material such as a heavy duty nylon, canvas or the like. The strip 40 can be attached to the canopy body 4 and the secondary retaining means 38 in the manner described above for the strip 30.

In an alternate embodiment, the secondary retaining means 38 can be a rod that attaches to the canopy body 4 near the apex 16 and extends to a point near the perimeter 12 of the canopy body. When placed in a tree, the canopy 2 would be arranged so that the attachment point near the perimeter is located furthest from the tree; i.e., opposite to the placket 19 as shown in FIG. 7. In the alternate embodiment, the rod does not provide an additional point of attachment to the tree, but it nevertheless reduces the tendency of the canopy 2 to lift under the influence of wind.

In preferred embodiments, the canopy 2 also includes hanging means 42 for hanging gear, provisions or other items underneath the canopy 2. Means 42 can be, for example, a "D-"ring or the like that is attached to a nylon strip that is, in turn, attached to the canopy body 4.

FIG. 9 shows an example of pattern dimensions suitable for forming a canopy 2 according to the present invention. The embodiment illustrated in FIG. 9 provides for a slit body since it incorporates a sealed sleeve 14a.

The radius, $r_1$, defined as the distance from the center 90 of the pattern to the edge 92 of pattern is 38.75 inches. The radius, $r_2$, defined as the distance from the center 90 to the beginning of the finished sleeve 14a is 36 inches. Angle α subtended by the cut lines 94a and 94b is 121.3°. The distance M is 31.38 inches, the distance N is 17.65 inches and the distance O is 3 inches.

Although a number of specific embodiments of this invention have been shown and described herein, it is to be understood that these embodiments are merely illustrative of the many possible specific arrangements that can be devised in application of the principles of the invention. Numerous and varied other arrangements can be devised in accordance with these principles by those of ordinary skill in the art without departing from the scope and spirit of the invention.

I claim:

1. A canopy for use in a tree for providing partial shelter for a user situated thereunder, comprising:
    a canopy body having a substantially circular perimeter when in use;
    a member attached to a first side and near a center of the canopy body by which the canopy body is suspendable from the tree;
    a frame detachably coupled to the canopy body near the perimeter.

2. The canopy of claim 1 and further comprising means disposed near the perimeter of the canopy body for receiving the frame.

3. The canopy of claim 1 and further comprising at least one primary retaining member for stabilizing the canopy in windy conditions.

4. The canopy of claim 3 wherein the primary retaining member provides a second point of attachment to the tree.

5. The canopy of claim 3 and further comprising spaced secondary retaining members disposed near the perimeter of the canopy body, the secondary retaining members useful for further stabilizing the canopy.

6. The canopy of claim 1 and further comprising a member attached to a second side of the canopy body that is suitable for hanging articles.

7. The canopy of claim 2 wherein the means is a sleeve.

8. The canopy of claim 7 wherein the canopy body is radially slit to facilitate placing the frame within the sleeve.

9. The canopy of claim 8 and further comprising primary closure members placed along the radial slit in the canopy body.

10. The canopy of claim 9 and further comprising a secondary closure member placed along the radial slit proximal to the perimeter of the canopy body.

11. The canopy of claim 1 wherein the canopy body is formed of a material selected from the group consisting of water resistant nylon and water proof nylon.

12. The canopy of claim 11 wherein material weight is in the range of 200 to 400 denier.

13. The canopy of claim 1 wherein the member is a D-ring.

14. The canopy of claim 1 wherein the frame comprises a plurality of frame segments.

15. The canopy of claim 14 wherein the frame segments are shock-corded together.

16. A canopy for use in a tree for providing partial shelter to a user situated thereunder, comprising:
    a canopy body;
    a frame detachably coupled to the canopy body near a perimeter thereof; and
    a member for suspending the canopy body from a tree, the member depending from a central region of the canopy body so that when suspended, the canopy body has a substantially conical configuration wherein the frame defines a base, and the central region defines an apex, of the substantially conical configuration; and further wherein,
    when the canopy body is suspended from the tree, the base is disposed in a substantially non-orthogonal orientation to the tree.

17. The canopy of claim 16, and further comprising a primary retaining means for stabilizing the canopy in windy conditions by providing a second point of attachment to the tree.

* * * * *

UNITED STATES PATENT AND TRADEMARK OFFICE
CERTIFICATE OF CORRECTION

Patent No. : 5,787,914
Issued : August 4, 1998
Inventor : Dennis S. Greywall

It is certified that error appears in the above-identified patent and that said Letters Patent is hereby corrected as shown below:

Claim 8, line 1: change "is radially" to --has a radial--.

Claim 9, line 2: change "placed" to --disposed--.

Claim 10, line 2: change "placed" to --disposed--.

Signed and Sealed this

Sixteenth Day of February, 1999

Attest:

Attesting Officer

*Acting Commissioner of Patents and Trademarks*